United States Patent
Kobayashi

(10) Patent No.: US 6,287,204 B1
(45) Date of Patent: Sep. 11, 2001

(54) ADJUSTABLE TORQUE LIMITER

(75) Inventor: Yuji Kobayashi, Yokohama (JP)

(73) Assignee: Nifco Inc., Yokohama (JP)

( * ) Notice: Subject to any disclaimer, the term of this patent is extended or adjusted under 35 U.S.C. 154(b) by 0 days.

(21) Appl. No.: 09/400,276

(22) Filed: Sep. 21, 1999

(30) Foreign Application Priority Data

Sep. 28, 1998 (JP) ................................. 10-273002

(51) Int. Cl.$^7$ ................................................. F16D 27/01
(52) U.S. Cl. ..................... 464/29; 464/30; 310/75 R; 310/75 D
(58) Field of Search ..................... 464/29, 30; 310/75 D, 310/75 R, 76, 78, 84; 192/84.3

(56) References Cited

U.S. PATENT DOCUMENTS

| | | | |
|---|---|---|---|
| 1,946,919 | * | 2/1934 | Smitmans ........................ 310/75 R X |
| 2,500,175 | * | 3/1950 | Guthrie ............................... 310/75 D |
| 3,076,905 | * | 2/1963 | Watson ................................ 310/78 X |
| 4,237,703 | * | 12/1980 | Wahl, Jr. .............................. 464/29 |
| 5,158,279 | * | 10/1992 | Laffy et al. ........................ 464/29 X |
| 5,178,582 | * | 1/1993 | Maji et al. ......................... 464/29 X |
| 5,579,880 | * | 12/1996 | Feldhaus et al. .................. 464/29 X |

* cited by examiner

*Primary Examiner*—Lynne H. Browne
*Assistant Examiner*—Greg Binda
(74) *Attorney, Agent, or Firm*—Kanesaka & Takeuchi

(57) ABSTRACT

A torque limiter is formed of a shaft, a cylindrical magnet attached to an outer periphery of the shaft, and a housing for rotationally supporting the axial ends of the shaft and formed of first and second housing portions. A magnetizable member in a cylindrical shape is attached to inner peripheries of the first and second housing portions to thereby form a space between cylindrical portions of the first and second housing portions. The magnetizable member faces an outer periphery of the magnet with a predetermined gap therebetween when the magnet is inserted into the magnetizable member. A ring containing magnetizable materials therein is attached to the space on an outer periphery of the magnetizable member. The ring changes an apparent volume of the magnetizable member, so that torque of the torque limiter is adjusted by selecting a proper ring.

13 Claims, 4 Drawing Sheets

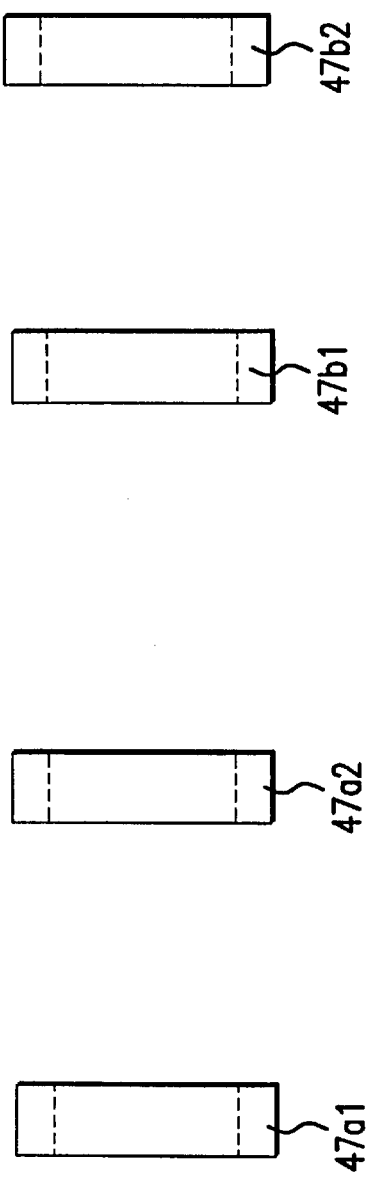
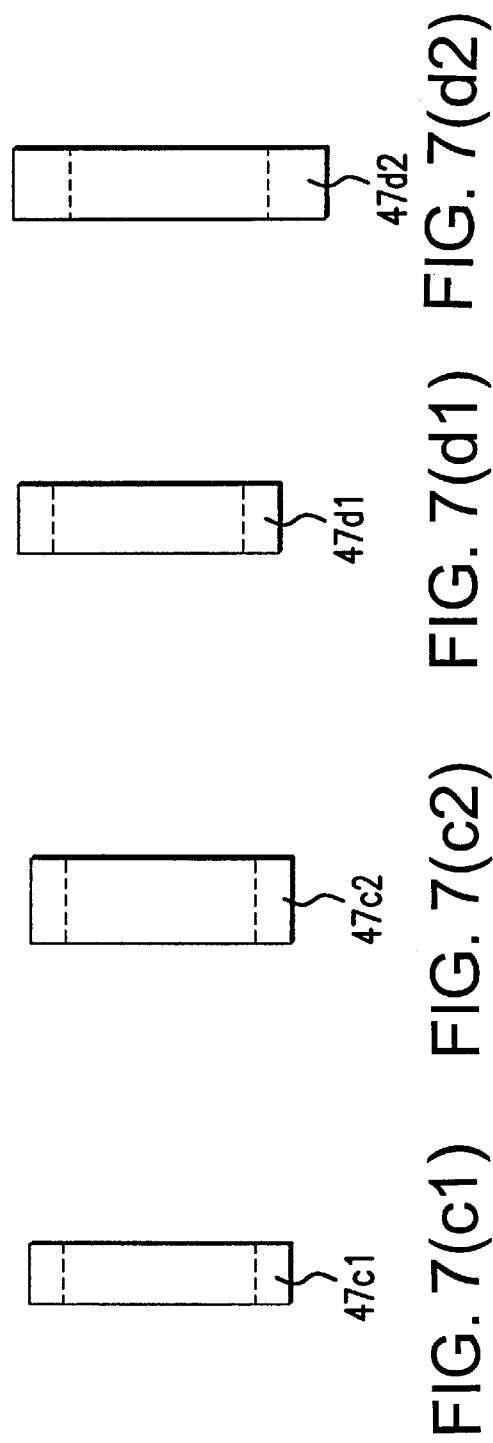

ADJUSTABLE TORQUE LIMITER

BACKGROUND OF THE INVENTION AND RELATED ART STATEMENT

The present invention relates to a torque limiter, which transmits a predetermined torque constantly, and stops transmission of torque in case a load more than a predetermined load is applied.

In order to feed a sheet of paper one by one, a paper feeding mechanism for a printer or the like is provided with a rubber-made first roller rotated by a first rotational shaft in a paper feeding direction; a rubber-made second roller rotated by a second rotational shaft in a paper returning direction, outer peripheries of the first roller and the second roller contacting with each other in axial directions; and a torque limiter disposed between the second rotational shaft and the second roller.

Incidentally, the first rotational shaft and the second rotational shaft rotate in the same directions In the paper feeding mechanism as structured above, in case one sheet of paper is inserted between the first roller and the second roller, since a frictional force between the first roller and the sheet is greater than a set torque of the torque limiter, the second roller is rotated in a direction opposite to the direction of rotation of the first roller, so that the sheet of paper is sent out.

However, in case two sheets of paper are inserted between the first roller and the second roller, since a frictional force between the sheets of paper is smaller than the set torque of the torque limiter, the first roller is rotated in the paper feeding direction to send out one of the sheets, and the second roller is rotated in the paper returning direction to return the other sheet, so that the sheet of paper is sent out one by one.

FIG. 6 is a partly sectional front view of a conventional torque limiter, wherein an upper half of the torque limiter except a shaft is shown in section.

In FIG. 6, numeral 1 designates a shaft which is made of a synthetic resin and is formed into a cylindrical shape. The shaft 1 has a large diameter portion 2, which has an outer diameter slightly smaller than an inner diameter of a magnet 7, described later, and is inserted into the magnet 7. Small diameter portions 3 and 4 are connected to both end sides of the large diameter portion 2 to be inserted into through holes 12 and 15 of a housing 9, described later.

And, the small diameter portion 4 protruded from the housing 9 is provided with an engaging portion 5 with which a pin or the like engages, and a flange 6 having a diameter smaller than the outer diameter of the magnet 7 is provided on an outer periphery of a boundary portion between the large diameter portion 2 and small diameter portion 4.

Numeral 7 is the cylindrical magnet. The magnet 7 has a length in an axial direction (hereinafter simply referred to as a length) approximately the same as the length of the large diameter portion 2, and an inner diameter slightly larger than the outer diameter of the large diameter portion 2.

The magnet 7 is fixed on the outer periphery of the large diameter portion 2 by an adhesive.

Numeral 8 designates a hysteresis member in a cylindrical shape, i.e. magnetic or magnetizable material including a ferromagnetic material. The hysteresis member 8 has a length approximately the same as or longer than the large diameter portion 2, and an inner diameter which allows an inner periphery of the hysteresis member to face the outer periphery of the magnet 7 with a predetermined gap, for example, 0.1 mm, therebetween.

Numeral 9 designates a housing made of a synthetic resin, and the housing 9 is formed of a housing main body 10 and a circular cap 14. The housing main body 10 includes a bottom portion 11 having a circular through hole 12 in the center thereof to which the small diameter portion 3 is inserted, and a cylindrical portion 13 formed around the periphery of the bottom portion 11. The large diameter portion 2 and the magnet 7 abut against the bottom portion 11 through a washer 16, described later. The cap 14 includes a circular through hole 15 at a central portion thereof, through which the small diameter portion 4 is inserted. The cap 14 is fixed to the housing main body 10 by an adhesive such that the cap 14 closes an open end of the housing main body in a condition that the flange 6 abuts against the cap 14.

Incidentally, the housing main body 10 has an inner diameter which allows the hysteresis member 8 to be press-fitted therein by a predetermined force, and an inner size of the housing 9 in an axial direction at a central portion thereof is approximately the same as a length from an end of the large diameter portion 2 at a side of the small diameter portion 3 to an end of the flange 6 at a side of the small diameter portion 4.

Numeral 16 designates the washer which is made of a synthetic resin and shaped in a sheet form. The washer 16 is interposed between the large diameter portion 2 with the magnet 7 and the housing main body 10, so as to set coefficient of friction between the magnet 7 and the housing main body 10 at a predetermined value.

Next, an operation of the conventional torque limiter will be explained.

A rotational shaft omitted in the figure is inserted into the shaft 1 of the torque limiter shown in FIG. 6, and a pin or the like provided at the rotational shaft is engaged with the engaging portion 5 to fix the shaft 1 to the rotational shaft. In this state, when the rotational shaft is rotated in a predetermined direction, by magnetic coupling between the magnet 7 and the hysteresis member 8, the housing 9 is rotated in the same direction as the rotational direction of the rotational shaft.

However, in case a load greater than the torque for integrally rotating the magnet 7 and the hysteresis member 8 is applied to the housing 9, the magnet 7 and the hysteresis member 8 do not transmit the rotational force, so that the housing 9 does not rotate together with the rotational axis.

The respective components forming the torque limiter, i.e. shaft 1, magnet 7, hysteresis member 8, housing main body 10 and cap 14, have tolerances or differences in size, so that a gap between the magnet 7 and the hysteresis member 8 in the assembled condition is different individually. Also, there are differences in sliding characteristics of the sliding portions, such as shaft 1, housing main body 10 and cap 14, and differences also exist in characteristics of the magnet 7 and the hysteresis member 8.

Thus, in case the torque limiter is assembled, the tolerances or differences appear in torque due to various elements.

However, it is impossible to finely adjust the torque to fall within a predetermined range after the torque limiter is assembled. Therefore, it is impossible to improve a yield by lowering defective rate of the torque limiters.

Accordingly, the present invention has been made to solve the aforementioned problems, and an object of the invention is to provide a torque limiter, in which after the torque limiter is assembled, torque can be adjusted to be within a predetermined range to thereby improve a yield.

Another object of the invention is to provide a torque limiter as stated above, in which torque of the torque limiter can be adjusted easily.

A further object of the invention is to provide a torque limiter as stated above, in which the torque limiter can be assembled easily.

Further objects and advantages of the invention will be apparent from the following description of the invention.

SUMMARY OF THE INVENTION

To achieve the aforementioned objects, the present invention provides a torque limiter, which includes a shaft, a cylindrical magnet attached to an outer periphery of the shaft, a housing for rotationally supporting axial ends of the shaft and having first and second housing portions with cylindrical portions, and a magnetizable member in a cylindrical shape. The magnetizable member is attached to the inner peripheries of the cylindrical portions of the first and second housing portions to thereby form a space between the cylindrical portions of the first and second housing portions. An inner periphery of the magnetizable member faces an outer periphery of the magnet with a predetermined gap therebetween when the magnet is inserted into the magnetizable member. In the invention, a ring containing magnetizable materials therein is attached to the space on an outer periphery of the magnetizable member. The ring changes an apparent volume of the magnetizable member.

In other words, the housing is divided in a middle of the axial direction thereof into the first and second housing portions, i.e. housing main body and cap. The housing has a length such that the space is provided between the housing main body and the cap in the condition that the torque limiter is assembled. The cylindrical portion of the first and second housing portions may have the same lengths. The ring, in which the magnetizable materials or magnetic substance particles are mixed, is mounted on the outer periphery of the magnetizable member.

BRIEF DESCRIPTION OF THE DRAWINGS

FIGS. 7(a1) 7(d2) are side views of different examples of the rings.

DETAILED DESCRIPTION OF PREFERRED EMBODIMENTS

Hereinafter, embodiments of the present invention will be explained with reference to the attached drawings.

Figure 1:
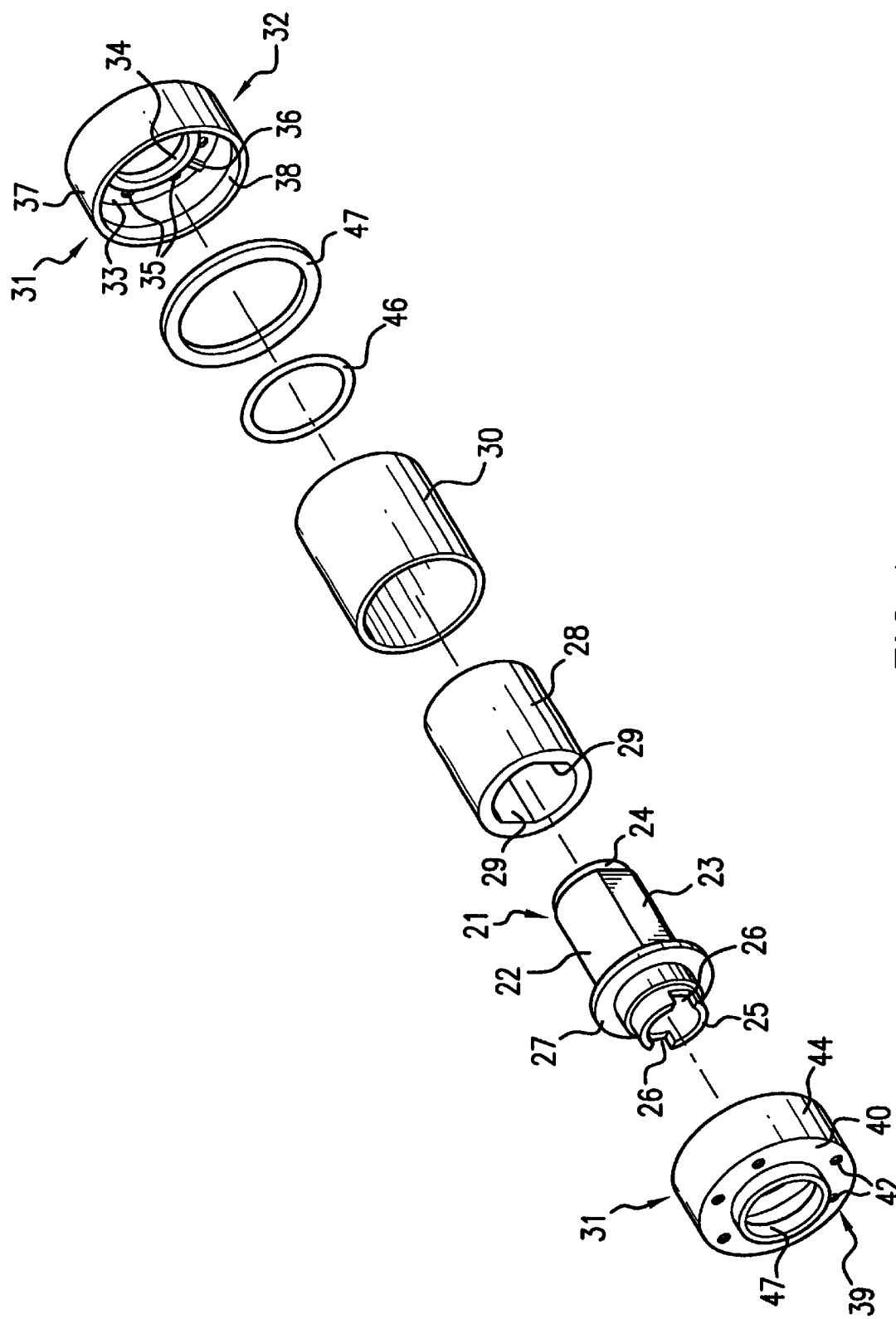
FIG. 1 is an exploded perspective view of a torque limiter of an embodiment of the invention.
Figure 2:
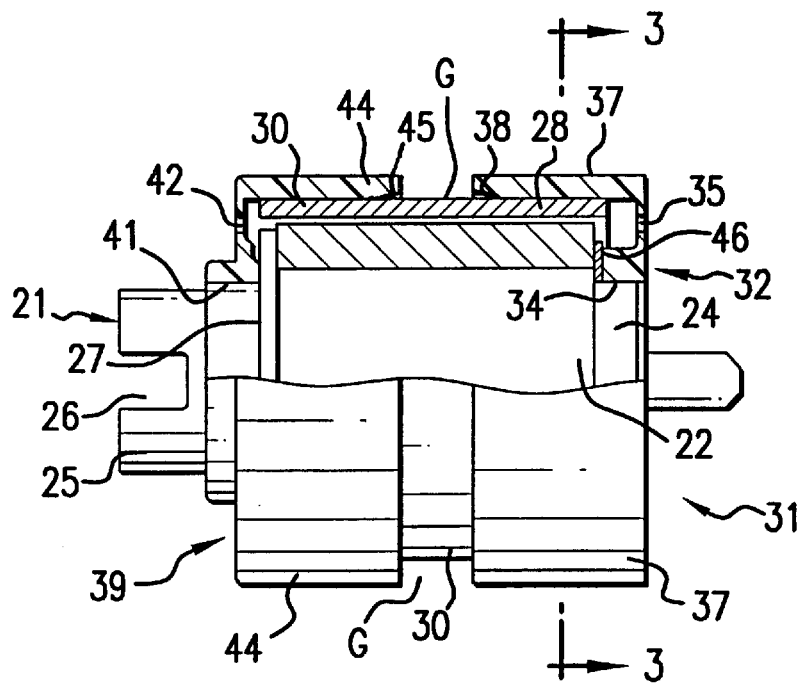
FIG. 2 is a front view showing an assembled condition of the components except a ring shown in FIG. 1, wherein an upper half of the torque limiter except a shaft is shown in section.
Figure 3:
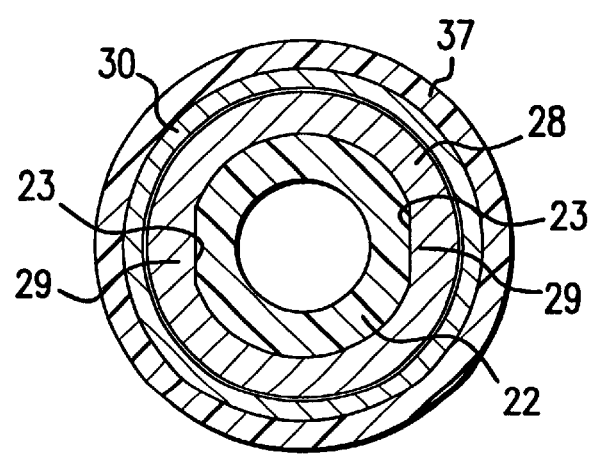
FIG. 3 is a sectional view taken along line 3—3 in FIG. 2.
Figure 4:
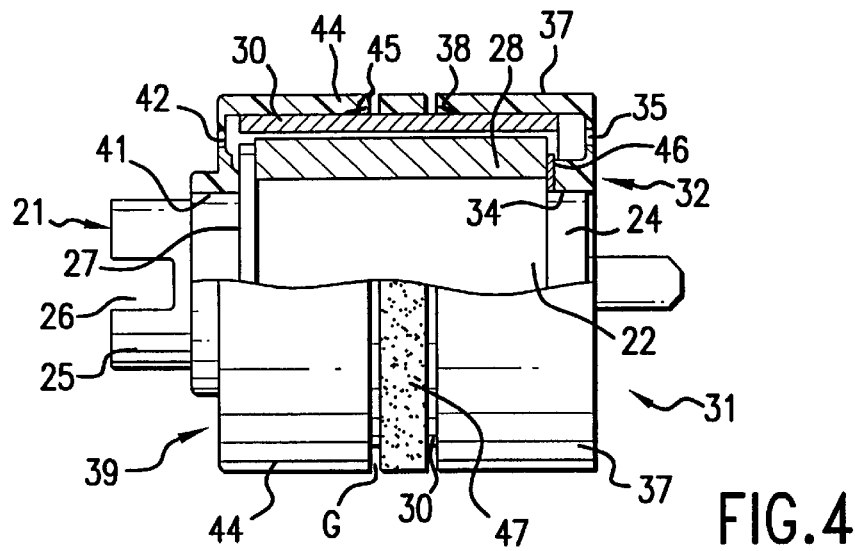
FIG. 4 is a front view showing a condition that a ring is attached after the torque limiter is assembled in the state shown in FIG. 2, wherein an upper half of the torque limiter except the shaft is shown in section.

FIG. 1 is an exploded perspective view of a torque limiter as an embodiment of the present invention; FIG. 2 is a front view showing an assembled condition of the components except a ring shown in FIG. 1, wherein an upper half of the torque limiter except a shaft is shown in section; FIG. 3 is a sectional view taken along line 3—3 in FIG. 2; and FIG. 4 is a front view showing a condition that a ring is attached after the torque limiter is assembled in the state shown in FIG. 2, wherein an upper half of the torque limiter except the shaft is shown in section.

In these drawings, numeral 21 designates a shaft which is formed into a cylindrical shape by heat-resisting amorphous polycarbonate. The shaft 21 includes a large diameter portion 22, which has an outer diameter slightly smaller than an inner diameter of a magnet 28, described later, and is provided with cut portions 23 referred to as "I cut" formed by cutting outer portions of the large diameter portion 22 symmetrically with respect to a center axis in the axial direction. The large diameter portion 22 inserted into the magnet 28 are connected at both sides thereof to small diameter portions 24, 25 which are respectively inserted into through holes 34, 41 of a housing 31, described later.

The small diameter portion 25 protruded from the housing 31 is provided with an engaging portion 26 for engaging a pin or the like, and a flange 27 having a diameter smaller than the outer diameter of the magnet 28 is formed on an outer periphery of a boundary portion between the large diameter portion 22 and the small diameter portion 25.

Numeral 28 designates the cylindrical magnet. The magnet 28 has a length approximately the same as that of the large diameter portion 22, and an inner diameter slightly larger than the outer diameter of the large diameter portion 22. Also, the magnet 28 is provided with thick portions 29, which extend in the axial direction on an inner surface thereof corresponding to the cut portions 23, each thick portion protrudes from the inner surface thereof for a size corresponding to the size cut off from the large diameter portion 22 to form the cut portion 23.

Numeral 30 designates a hysteresis member made of a magnetic or magnetizable material including a ferromagnetic material. The hysteresis member 30 has a length longer than a length from an end of the large diameter portion 22 at a side of the small diameter portion 24 to an end of the flange 27 at a side of the small diameter portion 25, and an inner diameter of the hysteresis member 30 is set such that an inner periphery of the hysteresis member 30 faces an outer periphery of the magnet 28 with a predetermined gap therebetween, for example, about 0.1 mm.

Numeral 31 designates the housing, and the housing 31 comprises a housing main body or first housing portion 32 and a cap or second housing portion 39, which are formed by high sliding type polyoxymethylene congenial to or compatible with amorphous polycarbonate.

The housing main body 32 is formed of a bottom portion (first bottom portion) 33, and a circular cylinder portion (first cylinder portion) 37 provided on an outer periphery of the bottom portion 33. The first bottom portion 33 includes a circular through hole 34 at a center thereof, into which the small diameter portion 24 is inserted, a predetermined number of vent holes 35 provided on a concentric circle with the through hole 34, and projections 36 on an inner side thereof abutting against an end surface of the hysteresis member 30, which are formed in a predetermined height and disposed with a predetermined space between the projections in a circumferential direction. The large diameter portion 22 and the magnet 28 abut against the bottom portion 33 through the washer 46, described later. The cylinder portion 37 includes, at an inner surface of an open side thereof, a surrounding taper surface 38 tapered toward the bottom portion 33.

Also, the cap 39 is formed of a bottom portion (second bottom portion) 40, and a circular cylinder portion (second cylinder portion) 44 provided on an outer periphery of the second bottom portion 40. The second bottom portion 40 includes, at a center thereof, a circular through hole 41, into which the small diameter portion 25 is inserted, and a predetermined number of vent holes 24 formed on a concentric circle with the through hole 41, so that the bottom portion 40 is not closed by the flange 27 in the condition that the flange 27 abuts against the bottom portion 40. Also, the second bottom portion 40 includes, on an inner side thereof, projections 43 (not shown), similar to the projections 36, abutting against an end surface of the hysteresis member 30, which are formed in a predetermined height and disposed with a predetermined space between the projections in a circumferential direction. The second cylinder portion 44 includes, at an inner surface of an open end side thereof, a surrounding taper surface 45 tapered toward the bottom portion 40.

Incidentally, the housing main body 32 and the cap 39 respectively have inner diameters which allow the hysteresis member 30 to be press-fitted therein by a predetermined force.

And, an effective length, which is obtained by adding a length in the axial direction from the open end of the housing main body 32 to the projections 36 and a length in the axial direction from the open end of the cap 39 to the projections 43, is shorter, for a predetermined length, than the hysteresis member 30. Thus, a space G is formed between the housing main body 32 and the cap 39 when the torque limiter is assembled.

Numeral 46 designates a washer, which is a sheet made of a synthetic resin, and the washer 46 is interposed between the large diameter portion 22 with the magnet 28 and the housing main body 32, so as to set coefficient of friction therebetween at a predetermined value.

Numeral 47 designates a ring which is mounted on the outer periphery of the hysteresis member 30. The ring 47 is formed of a rubber, such as a silicone rubber, mixed with particles of a magnetic or magnetizable material including ferromagnetic material powder and magnetic material powder, such as iron or iron alloy, but the ring is different from the material mixed with particles of a magnetic material which is magnetized.

Next, an example of assembling the torque limiter will be explained.

Firstly, the housing main body 32 oriented to have the cylinder portion 37 at a lower side is placed on the hysteresis member 30 which is placed on a working table such that an axis of the hysteresis member 30 is directed to a vertical direction. Thereafter, the housing main body 32 is pushed down so as to enter the hysteresis member 30 into the cylinder portion 37 until the end surface of the hysteresis member 30 abuts against the projections 36.

Then, the shaft 21 is oriented such that the small diameter portion 25 is located at a lower side, and an axis of the shaft is directed in a vertical direction, and the large diameter portion 22 is inserted into the magnet 28 by positioning the cut portions 23 to correspond to the thick portions 29 so that the magnet 28 is placed on the flange 27. Thereafter, the washer 46 is placed on the end surfaces of the large diameter portion 22 and the magnet 28.

Next, from a lower side of the hysteresis member 30 assembled with the housing main body 32 in a condition that the housing main body 32 is located at an upper side, the shaft 21 is elevated to insert the magnet 28 into the hysteresis member 30 to thereby enter the small diameter portion 24 into the through hole 34. Also, the large diameter portion 22 and the magnet 28 abut against the bottom portion 33 through the washer 46.

Then, after the above assembly is turned upside down and placed on the working table to orient the axis in the vertical direction, the small diameter portion 25 is inserted into the through hole 41 of the cap 39 wherein the cylinder portion 44 is located at a lower side, so that the cap 39 is placed on the hysteresis member 30. Then, the cap 39 is pushed down to enter the hysteresis member 30 into the cylinder portion 44 until the end surface of the hysteresis member 30 abuts against the projections 43. Accordingly, the components can be assembled as in the state shown in FIG. 2.

When the components are assembled in the state shown in FIG. 2, a surrounding space G is formed between the housing main body 32 and the cap 39. The ring 47 is mounted on an outer periphery of the hysteresis member 30 in the space G by utilizing elasticity of the ring 47, so that the components can be assembled in the state shown in FIG. 4.

Figure 5:
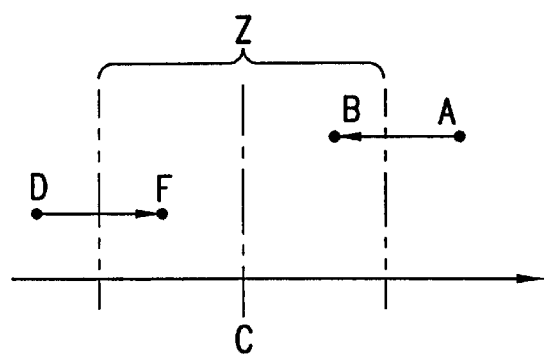
FIG. 5 is an explanatory diagram for explaining a fine adjustment of torque by using the ring.
Figure 6:
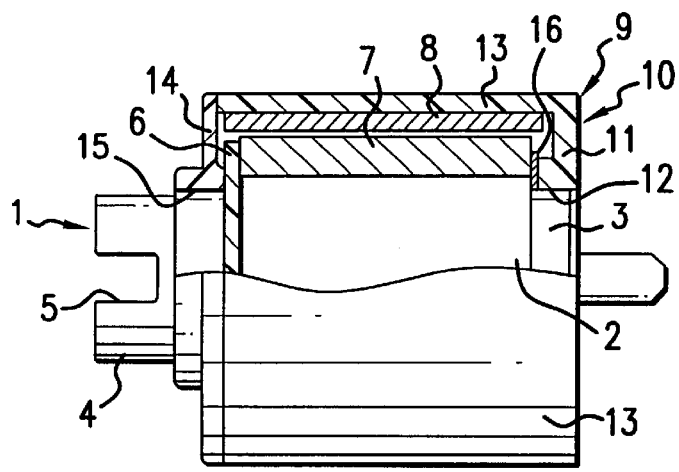
FIG. 6 is a front view of a conventional torque limiter, wherein an upper half thereof except a shaft is shown in section.

FIG. 5 is an explanatory diagram for explaining the fine adjustment of torque by using the ring.

Incidentally, in case the magnet 28 remains the same and the thickness in a radial direction of the hysteresis member 30 is changed, that is, a volume of the hysteresis member 30 is changed, it has been clarified through experiments that torque is decreased by increasing the volume of the hysteresis member 30 and torque is increased by decreasing the volume of the hysteresis member 30.

Therefore, in case the torque is finely adjusted, the volume of the hysteresis member may be changed.

Next, an example of a fine adjustment of torque will be explained.

Firstly, the torque limiter is designed such that torque is slightly greater than a torque adequate range Z shown in FIG. 5 in a condition that the ring 47 is not mounted on the torque limiter.

Thus designed torque limiter is assembled into the state shown in FIG. 2.

Then, for example, in case a measured torque is a torque A which is greater than the torque adequate range Z, the ring 47 for increasing an apparent volume of the hysteresis member 30 is mounted in the space G such that the torque becomes, for example, a torque B, which is within the torque adequate range Z. Accordingly, the torque A can be finely adjusted to the torque B which is within the torque adequate range Z.

Next, another example of a fine adjustment of the torque will be explained.

Firstly, the torque limiter is designed to have a torque C at a center of the torque adequate range Z shown in FIG. 5 in a condition that the ring 47, to which adequate magnetic material particles are mixed, is mounted on the torque limiter. Thus designed torque limiter is assembled into the state shown in FIG. 2.

Then, in case a measured torque is the torque A which is greater than the torque adequate range Z, the ring 47 containing the magnetic particles at a mixing rate increased from that at the time of designing the torque limiter to thereby increase an apparent volume of the hysteresis member 30 is mounted in the space G such that the torque becomes the torque B within the torque adequate range Z. Accordingly, the torque A can be finely adjusted to the torque B which is within the torque adequate range Z.

Also, in case a measured torque is a torque D which is less than the torque adequate range Z, the ring 47 containing the magnetic material particles at a mixing rate decreased from that at the time of designing the torque limiter to thereby decrease an apparent volume of the hysteresis member 30 is mounted in the space G such that the torque becomes, for example, a torque F within the torque adequate scope Z. Accordingly, the torque D can be finely adjusted to the torque F which is within the torque adequate range Z. The ring may include a plurality of ring members containing the magnetizable materials in different ratios. One of the ring members is attached to the magnetizable member or hysteresis member 30 to thereby adjust torque of the torque limiter after the torque limiter is assembled. Rings 47a1, 47a2 in FIGS. 7(a1), 7(a2) contain magnetic material particles with different mixing ratios.

The method of changing the apparent volume of the hysteresis member 30 as described above may be carried out, in addition to changing the mixing rate of the magnetic material particles, by the followings. Namely, a quality of the magnetic material particles mixed in the ring may be changed to, for example, iron, cobalt, nickel, or an alloy of these materials, i.e. weak or strong materials. The ring may include a plurality of ring members containing different qualities of the magnetizable materials. One of the ring members is attached to the magnetizable member or hysteresis member 30 to thereby adjust torque of the torque limiter after the torque limiter is assembled. Rings 47b1, 47b2 in FIGS. 7(b1), 7(b2) contain magnetic particles with different qualities. The width of the ring may be changed without changing the mixing rate of the magnetic material particles The ring may include a plurality of ring members with different widths. One of the ring members is attached to the magnetizable member or hysteresis member 30 to thereby adjust torque of the torque limiter after the torque limiter is assembled. Rings. 47c1, 47c2 in FIGS. 7(a1), 7(c2) are different in width. The thickness of the ring in the radial direction may be changed without changing the mixing rate of the magnetic material particles The ring may include a plurality of ring members with different thicknesses. One of the ring members is attached to the magnetizable member or hysteresis member 30 to thereby adjust torque of the torque limiter after the torque limiter is assembled. Rings 47d1, 47d2 in FIGS. 7(d1), 7(d2) are different in thicknesses.

As described above, according to the embodiment of the present invention, since torque can be finely adjusted by the ring 47, which is attached in the space G after the torque limiter is assembled, defective ratio of the torque limiters can be adjusted to improve the yield.

And, since the shaft 21 is provided with the cut portions 23 and the magnet 28 is provided with the thick portions 29, by simply inserting the shaft 21 into the magnet 28, the magnet 28 can be attached to the shaft 21 so as not rotate in the peripheral direction of the shaft 21.

Therefore, without using an adhesive, the magnet 28 can be attached to the shaft 21 efficiently with good workability so as not to rotate.

Also, the housing 31 is structured by the housing main body 32 formed of the bottom portion 33 and the cylinder portion 37, and the cap 39 formed of the bottom portion 40 and the cylinder portion 44, and the hysteresis member 30 is press-fitted in the respective cylinder portions. Therefore, by utilizing accurate outer peripheral surface of the hysteresis member 30, the housing 31 can be assembled efficiently with good workability without using the adhesive while an adequate positional relationship (coaxial degree) of the through holes 34 and 41 for supporting the shaft 21 is maintained.

Moreover, since the inner surfaces of the open end sides of the respective cylinder portions 37 and 44 are formed as the surrounding taper surfaces 38 and 45 which are respectively tapered toward the bottom portions 33 and 40, the taper surfaces 38 and 45 function as guide surfaces when the hysteresis member 30 is pressed to enter into the cylinder portions.- Thus, the hysteresis member 30 can be easily press-entered into the cylinder portions 37 and 44 without breaking the cylinder portions.

Furthermore, since an effective size of the housing 31 is made shorter than that of the hysteresis member 30, a value obtained by adding the length of the hysteresis member 30 to the thicknesses of the bottom portions 33 and 40 constitutes a length of the housing 31. Thus, the length of the housing 31 can be accurately obtained easily.

Also, since the shaft 21 is formed by the amorphous polycarbonate and the housing main body 32 and the cap 39 are formed by the high sliding type polyoxymethylene which is congenial to or compatible with amorphous polycarbonate, coefficient of friction can be lowered to obtain the stable sliding characteristics.

Further, since the bottom portions 33 and 40 of the housing 31 are provided with the vent holes 35 and 42, warm air in the housing 31 flows out through the vent holes 35 and 42, or air entered into the vent holes 35 flows out through the vent holes 42, so that heat is emitted to thereby prevent temperature rise in the housing 31. Therefore, torque can be stabilized by preventing lowering of torque due to the temperature rise.

Although engaging means is formed of the cut portions 23 and thick portions 29 in the aforementioned embodiment, as long as the shaft 21 can be inserted into the magnet 28 and the magnet 28 is not rotatable in the peripheral direction of the shaft 21, for example, engaging means, such as a D cut, a combination of a groove and a projecting, or polygon, may be used.

Also, although the projections 36 and 43 are provided such that the vent holes 35 and 42 are not closed by the end surfaces of the hysteresis member 30 in the embodiment, if the end surfaces of the hysteresis member 30 do not close the vent holes 35 and 42, the projections 36 and 43 may be omitted.

Furthermore, it is needless to say that the ring 47 may be formed as an O-ring, a rectangular ring, or triangular ring as long as a section of the ring has a shape corresponding to an outer periphery of the hysteresis member 30.

As described above, according to the present invention, since the torque can be finely adjusted by the ring which is attached in the space after the torque limiter is assembled, the defective ratio of the torque limiters can be lowered to thereby improve the yield.

While the invention has been explained with reference to the specific embodiments of the invention, the explanation is illustrative and the invention is limited only by the appended claims.

What is claimed is:

1. A torque limiter, comprising:
   a shaft having two axial ends,
   a cylindrical magnet attached to an outer periphery of the shaft,
   a housing for rotationally supporting the axial ends of the shaft, said housing being formed of first and second housing portions with cylindrical portions,
   a magnetizable member in a cylindrical shape attached to the inner peripheries of the cylindrical portions of the first and second housing portions to thereby form a space between the cylindrical portions of the first and second housing portions, said magnetizable member having an inner periphery facing an outer periphery of the magnet with a predetermined gap therebetween when the magnet is inserted into the magnetizable member, and a ring containing magnetizable materials therein and attached to the space on an outer periphery of the magnetizable member, said ring changing an apparent volume of the magnetizable member to thereby change torque of the torque limiter.

2. A torque limiter according to claim 1, wherein said ring includes a plurality of ring members containing the magnetizable materials in different ratios, one of the ring members being attached to the magnetizable member to thereby adjust torque of the torque limiter after the torque limiter is assembled.

3. A torque limiter according to claim 1, wherein said ring includes a plurality of ring members containing different qualities of the magnetizable materials, one of the ring members being attached to the magnetizable member to thereby adjust torque of the torque limiter after the torque limiter is assembled.

4. A torque limiter according to claim 1 wherein said ring includes a plurality of ring members with different widths, one of the ring members being attached to the magnetizable member to thereby adjust torque of the torque limiter after the torque limiter is assembled.

5. A torque limiter according to claim 1, wherein said ring includes a plurality of ring members with different thicknesses, one of the ring members being attached to the magnetizable member to thereby adjust torque of the torque limiter after the torque limiter is assembled.

6. A torque limiter according to claim 1, wherein said housing is divided in a middle of an axial direction thereof to allow the cylindrical portions of the first and second housing portions to have same lengths.

7. A torque limiter according to claim 6, wherein said shaft includes a first engaging portion at the outer periphery thereof, and said magnet includes a second engaging portion at an inner periphery thereof so that when the shaft is inserted into the magnet, the first and second engaging portions engage with each other to immovably fix the shaft to the magnet.

8. A torque limiter according to claim 7, wherein each of the first and second housing portions includes a bottom portion having an inserting hole for inserting one end of the shaft, and a plurality of vent holes for allowing air to flow into and out from the housing.

9. A torque limiter according to claim 8, wherein each of the cylindrical portions of the first and second housing portions is provided with a tapered inner surface tapered from an open end toward the bottom portion thereof so that an end of the magnetizable member is guided by the tapered inner surface when the magnetizable member is attached to the housing.

10. A torque limiter according to claim 1, wherein said ring is located between the cylindrical portions of the first and second housing portions.

11. A torque limiter according to claim 10, wherein said ring is formed of rubber containing the magnetizable particles.

12. A torque limiter according to claim 1, wherein each of the first and second housing portions includes a bottom portion and the cylindrical portion provided on an outer periphery of the bottom portion, said ring being located between the cylindrical portions of the first and second housing portions outside the magnetizable member.

13. A torque limiter according to claim 12, further comprising a synthetic resin washer, said shaft including a large diameter portion on which the cylindrical magnet is disposed, said synthetic resin washer being located between the large diameter portion with the magnet and the bottom portion the first housing.

* * * * *